United States Patent
Hofmann et al.

(10) Patent No.: US 12,544,016 B2
(45) Date of Patent: Feb. 10, 2026

(54) PROVISION OF THERMAL CONDUCTIVITY DATA RELATING TO AN ANATOMICAL STRUCTURE FOR A CRYOABLATION

(71) Applicant: Siemens Healthineers AG, Forchheim (DE)

(72) Inventors: Bernd Hofmann, Erlangen (DE); Matthias Lichy, Nuremberg (DE); Bernhard Schmidt, Fuerth (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 521 days.

(21) Appl. No.: 18/146,822

(22) Filed: Dec. 27, 2022

(65) Prior Publication Data
US 2023/0200755 A1 Jun. 29, 2023

(30) Foreign Application Priority Data
Dec. 29, 2021 (EP) ..................................... 21218116

(51) Int. Cl.
*A61B 6/03* (2006.01)
*G06T 7/00* (2017.01)

(52) U.S. Cl.
CPC .............. *A61B 6/03* (2013.01); *G06T 7/0012* (2013.01); *G06T 2207/10081* (2013.01)

(58) Field of Classification Search
CPC ............ A61B 6/03; A61B 2018/00511; A61B 2018/00577; A61B 2018/0293; A61B 2034/105; A61B 2090/3762; A61B 18/02; A61B 34/10; A61B 90/06; A61B 18/00; A61B 90/04; A61B 90/08; A61B 90/37; A61B 2018/00589; A61B 2018/0212;
(Continued)

(56) References Cited

U.S. PATENT DOCUMENTS

| 2010/0185087 A1 | 7/2010 | Nields et al. |
| 2011/0060221 A1 | 3/2011 | Fan et al. |
| 2011/0196385 A1 | 8/2011 | Altrogge et al. |

(Continued)

FOREIGN PATENT DOCUMENTS

| CN | 102008349 A | 4/2011 |
| WO | WO 2015148378 A1 | 10/2015 |

OTHER PUBLICATIONS

Talbot, Hugo et al: "Interactive Planning of Cryotherapy Using Physically-Based Simulation Interactive Planning of Cryotherapy Using Physics-Based Simulation"; Feb. 1, 2014; 918200; XP055292622; Gefunden im Internet: URL:https://hal.inria.fr/hal-00918200/file /Talbot_H.pdf;.

(Continued)

*Primary Examiner* — Molly Wilburn
(74) *Attorney, Agent, or Firm* — Harness, Dickey & Pierce, P.L.C.

(57) ABSTRACT

A method for providing thermal conductivity data relating to an anatomical structure, comprises: receiving first spectral computed tomography data relating to the anatomical structure; calculating a fat map of the anatomical structure and a water map of the anatomical structure based on the first spectral computed tomography data; calculating the thermal conductivity data relating to the anatomical structure based on the fat map and the water map; and providing the thermal conductivity data.

17 Claims, 3 Drawing Sheets

(58) Field of Classification Search
CPC .... A61B 2018/0231; A61B 2090/0463; G06T 7/0012; G06T 2207/10081
See application file for complete search history.

(56) References Cited

U.S. PATENT DOCUMENTS

2017/0209218 A1   7/2017  Sahay et al.
2018/0011158 A1*  1/2018  Katscher ............ G01R 33/4824
2018/0228568 A1*  8/2018  Kato ...................... A61B 90/11

OTHER PUBLICATIONS

Poppendiek, H.F. et al.: "Thermal conductivity measurements and predictions for biological fluids and tissues"; Cryobiology; Bd. 3, Nr. 4, Jan. 1, 1967; pp. 318-327; XP055934978; ISSN: 0011-2240; DOI: 10.1016/S0011-2240(67)80005-1;.

* cited by examiner

PROVISION OF THERMAL CONDUCTIVITY DATA RELATING TO AN ANATOMICAL STRUCTURE FOR A CRYOABLATION

CROSS-REFERENCE TO RELATED APPLICATION(S)

The present application claims priority under 35 U.S.C. § 119 to European Patent Application No. 21218116.8, filed Dec. 29, 2021, the entire contents of which are incorporated herein by reference.

FIELD

One or more example embodiments of the present invention relate to a method for providing thermal conductivity data relating to an anatomical structure. One or more example embodiments of the present invention further relate to a data processing system, a medical imaging system and a medical cryoablation system.

BACKGROUND

Cryoablation plays a key role in the treatment of tumors, for example tumors of the kidney, of the pancreas or of the bone.

In cryoablation, as in any thermal tissue destruction, the visualization of the ablation zone and the change of temperature in the tissue being treated and in the adjacent tissue is a decisive factor with regard to the success of the therapy. It is important here to effect a complete ablation of the tumor tissue without destroying relevant adjacent structures in the process.

A preinterventional determination of the thermal tissue conductivity is essential when it comes to planning the probe localization and assessing possible damage to the healthy tissue. Both factors are input into the intervention planning. During the ablation, the frozen zone must be represented as precisely as possible. Here, as in other thermal ablations, inadequate results can be caused by thermal bridges (large vessels). The change in the ablation zone over time is of particular relevance in this regard. Image artifacts caused by the inserted probes generally pose a problem when carrying out thermal ablations.

A medical imaging system, for example based on ultrasound imaging, magnetic resonance tomography (MRT) or computed tomography (CT), can be used for planning and monitoring the cryoablation.

In the ultrasound image, the freezing causes a reflection and the tissue information is thus extinguished. The fat content of the tissue influences the visual representation of the organ texture. Thermal bridges in the form of vessels can be assessed (Doppler, CEUS). Here, it is problematic that purely qualitative information is involved and that both the probe and the freezing lead to changes in the image information and thus make a precise representation of the ablation zone difficult.

In MRT, the temperature changes in the tissue can be represented via special sequences. It is also possible to carry out a semiquantitative fat analysis. These measurement sequences are however highly susceptible to artifacts. Furthermore, the freezing leads to susceptibility artifacts and thus to an inadequate assessment of the precise extent of the destroyed tissue.

SUMMARY

An object of one or more example embodiments of the present invention is to enable an alternative to a conventional planning and monitoring of a cryoablation. The subject matter of the independent claim(s) achieve(s) at least this object. Further advantageous aspects of one or more example embodiments of the present invention are taken into consideration in the dependent claims.

One or more example embodiments of the present invention relate to a method for providing thermal conductivity data relating to an anatomical structure, the method comprising:
receiving first spectral computed tomography data relating to the anatomical structure,
calculating a fat map of the anatomical structure and a water map of the anatomical structure on the basis of the first spectral computed tomography data,
calculating the thermal conductivity data relating to the anatomical structure on the basis of the fat map and the water map,
providing the thermal conductivity data.

A method for providing thermal conductivity data relating to an anatomical structure is further disclosed herewith, the method comprising:
receiving first spectral computed tomography data relating to the anatomical structure,
calculating the thermal conductivity data relating to the anatomical structure on the basis of the first spectral computed tomography data,
providing the thermal conductivity data.

Spectral computed tomography data, in particular the first spectral computed tomography data, can be recorded for example on the basis of photon-counting computed tomography and/or dual-energy computed tomography, in particular dual-source computed tomography.

The anatomical structure can be for example an organ, in particular a kidney, a pancreas or a bone. The anatomical structure can have for example the organ and a tissue adjacent to the organ. The fat map of the anatomical structure and the water map of the anatomical structure can be calculated for example on the basis of a material decomposition and/or a multicompartment segmentation. For example, the fat map of the anatomical structure and the water map of the anatomical structure can be calculated by a fat compartment and a water compartment being segmented, in particular simultaneously segmented, on the basis of the first spectral computed tomography data.

The thermal conductivity data can comprise for example a thermal conductivity map of the anatomical structure. The thermal conductivity data can for example relate to a thermal tissue conductivity and/or be used for planning and/or monitoring a cryoablation. The thermal tissue conductivity is determined essentially by the ratio of fat to water. An image point with a relatively high water content can for example be associated with a higher thermal conductivity than an image point with a relatively high fat content. The fat map and the water map can be used for example for planning a cryotherapy of a region of the anatomical structure to be treated, for example for calculating an extent of a cryoablation and/or for positioning a cryoablation probe.

In particular, it can be provided that a representation of a fluid-guiding substructure of the anatomical structure is generated on the basis of the first spectral computed tomography data and/or on the basis of the fat map of the anatomical structure and/or the water map of the anatomical structure, wherein the thermal conductivity data is calculated on the basis of the representation of the fluid-guiding substructure of the anatomical structure.

The fluid-guiding substructure of the anatomical structure can form a thermal bridge, for example. It is possible, for example, to introduce heat via the thermal bridge into the cryoablation zone in order to counteract the removal of heat which takes place via the cryoablation probe. The fluid-guiding substructure of the anatomical structure can be for example a vessel, in particular a blood vessel. The kidney, as an example of an anatomical structure, can have in particular a fluid-guiding substructure in the form of a renal calyx system. The representation of the fluid-guiding substructure can be generated for example in that it is calculated on the basis of an increased water content of the fluid-guiding substructure.

One embodiment provides that the anatomical structure has a region to be treated, wherein a representation of a freezing zone for a cryoablation of the region to be treated is calculated on the basis of the thermal conductivity data.

The region to be treated can be a tumor, for example. The freezing zone can be understood in particular to be a target ablation zone, the freezing of which effects a successful treatment of the region to be treated without destroying relevant adjacent structures in the process. The representation of the freezing zone can further be calculated on the basis of a representation of the region to be treated and/or a region to be left undamaged. In particular, a boundary zone of interest, for example in the form of a transition between the cortex and the perirenal tissue, can be taken into consideration in the calculation of the freezing zone.

One embodiment provides that, for each time point of a plurality of consecutive time points, a representation of the freezing zone relating to this time point is calculated in each case on the basis of the thermal conductivity data. Information about a freezing speed, for example, can be generated therefrom.

One embodiment provides that a position for a cryoablation probe is calculated on the basis of the thermal conductivity data, in particular calculated for the cryoablation of the region to be treated. The position of the cryoablation probe can be related for example to the anatomical structure and/or to a coordinate system of a cryoablation system. It can also be provided that, for each cryoablation probe of a plurality of cryoablation probes, a position for this cryoablation probe is calculated on the basis of the thermal conductivity data, in particular calculated for the cryoablation of the region to be treated.

One embodiment provides that the first spectral computed tomography data relates to the anatomical structure in a first state of the anatomical structure in which no cryoablation probe is introduced into the anatomical structure, wherein second spectral computed tomography data is received which relates to the anatomical structure in a second state of the anatomical structure in which a cryoablation probe is introduced into the anatomical structure, wherein on the basis of the first spectral computed tomography data and the second spectral computed tomography data, an image showing the anatomical structure in the second state of the anatomical structure is calculated, wherein hardening artifacts caused by the cryoablation probe in the second spectral computed tomography data are corrected on the basis of the first spectral computed tomography data in order to calculate the image showing the anatomical structure in the second state of the anatomical structure.

The second spectral computed tomography data can be recorded in particular while the cryoablation probe is introduced into the anatomical structure. In particular, the first spectral computed tomography data and the second spectral computed tomography data can be registered relative to one another, for example on the basis of a nonrigid deformation correction.

On the basis of the image showing the anatomical structure in the second state of the anatomical structure, the cryoablation probe and/or a position of the cryoablation probe relative to the anatomical structure can be visualized, in particular free from hardening artifacts and/or indirectly in the form of a deformation of the anatomical structure.

It can also be provided that the thermal conductivity data is further calculated on the basis of the second spectral computed tomography data.

One embodiment provides that the second spectral computed tomography data was recorded with a higher X-ray tube voltage than the first spectral computed tomography data.

The use of as high as possible an X-ray tube voltage for recording the second spectral computed tomography data makes it possible to reduce the hardening artifacts which are caused by the cryoablation probe in the second spectral computed tomography data.

One embodiment provides that third spectral computed tomography data is received which relates to the anatomical structure in a third state of the anatomical structure in which the cryoablation probe is introduced into the anatomical structure, wherein the third state of the anatomical structure results from the second state of the anatomical structure on account of a removal of heat via the cryoablation probe, wherein a density change map of the anatomical structure is calculated on the basis of the second spectral computed tomography data and the third spectral computed tomography data.

On account of the removal of heat via the cryoablation probe, in particular a freezing and thus a change in density can be effected. Here, an amount of the change in density corresponds to a degree of freezing. The density change card can relate in particular to an X-ray density and/or assign a CT value to each image point of a plurality of image points, for example on a Hounsfield scale.

The third spectral computed tomography data can be recorded in particular while the cryoablation probe is introduced into the anatomical structure. In particular, it can be provided that the second spectral computed tomography data and the third spectral computed tomography data are registered relative to one another, for example on the basis of a nonrigid deformation correction, and/or that the first spectral computed tomography data and the third spectral computed tomography data are registered relative to one another, for example on the basis of a nonrigid deformation correction.

It can also be provided that an image showing the anatomical structure in the third state of the anatomical structure is calculated on the basis of the first spectral computed tomography data and the third spectral computed tomography data, wherein hardening artifacts caused by the cryoablation probe and/or by a freezing in the third spectral computed tomography data are corrected on the basis of the first spectral computed tomography data in order to calculate the image showing the anatomical structure in the third state of the anatomical structure.

On the basis of the image showing the anatomical structure in the third state of the anatomical structure, the cryoablation probe and/or a position of the cryoablation probe relative to the anatomical structure can be visualized, in particular free from hardening artifacts and/or indirectly in the form of a deformation of the anatomical structure.

The second spectral computed tomography data and/or the third spectral computed tomography data can be recorded for example on the basis of photon-counting computed tomography and/or dual-energy computed tomography, in particular dual-source computed tomography.

In particular, it can be provided that the third spectral computed tomography data was recorded with a higher X-ray tube voltage than the first spectral computed tomography data. The use of as high as possible an X-ray tube voltage for recording the third spectral computed tomography data makes it possible to reduce the hardening artifacts which are caused by the cryoablation probe in the third spectral computed tomography data.

With the aid of spectral computed tomography, the change in density can be determined in particular independently of an assessment of the water content and the fat content, as the X-ray radiation in the region of the freezing is not fully extinguished. Spectral computed tomography, in particular in the form of monoenergetic imaging, can in particular help to reduce the hardening artifacts which are caused by the cryoablation probe and/or the freezing in the second spectral computed tomography data and/or in the third spectral computed tomography data.

One embodiment provides that a freezing map of the region to be treated is calculated on the basis of the density change map.

It can also be provided that the freezing map is further calculated on the basis of the thermal conductivity data and/or that the freezing map is further calculated on the basis of the fat map of the anatomical structure and/or the water map of the anatomical structure. The freezing map can in particular assign a degree of freezing to each image point of a plurality of image points. Image points can be for example 2D image points (pixels) or 3D image points (voxels, volume elements).

It can also be provided that the representation of the freezing zone calculated on the basis of the thermal conductivity data is shown overlaid onto the density change map and/or the freezing map.

One embodiment provides that an operating parameter of the cryoablation probe is calculated by a control algorithm being applied to the representation of the freezing zone as a reference variable and to the freezing map as a control variable. In this way, for example, the achievement of an optimum freezing can be monitored and/or an improved adaptation to a region to be left undamaged can take place in order to achieve as complete an ablation as possible. The operating parameter of the cryoablation probe can relate for example to a temperature of the cryoablation probe and/or a heat removal capacity of the cryoablation probe. In particular, the cryoablation probe can be controlled on the basis of the operating parameter of the cryoablation probe.

In particular, it can be provided that, for each ablation time point of a plurality of consecutive ablation time points during the cryoablation, in each case spectral computed tomography data is provided for this ablation time point and in each case a freezing map of the region to be treated is calculated as is described in the case of the third spectral computed tomography data.

A temporal course of the freezing can be analyzed for example on the basis of a vector analysis over the plurality of freezing maps and/or correlated with the thermal conductivity data and/or the representation of the freezing zone, in particular for each time point of the plurality of consecutive time points for which in each case a representation of the freezing zone was calculated, in particular in order to be able to assess an extent of the freezing, for example with regard to a correlation with a planned course of the cryoablation.

The first spectral computed tomography data can be recorded in particular without providing the anatomical structure with a contrast medium for this purpose. The second spectral computed tomography data can be recorded in particular without providing the anatomical structure with a contrast medium for this purpose. The third spectral computed tomography data can be recorded in particular without providing the anatomical structure with a contrast medium for this purpose.

Should contrast-medium-supported computed tomography become necessary during the cryoablation, for example if acute bleeding is suspected, a spectral segmentation of iodine is also possible within the ablation zone with reference to the existing density maps, for example in order to generate an iodine map of the anatomical structure.

Residual hemorrhages and larger areas of necrosis can also be visualized as described above and/or monitored during the cryoablation. The freezing can likewise be monitored by way of a change in the water content and/or the density.

One or more example embodiments of the present invention further relate to a data processing system for providing thermal conductivity data relating to an anatomical structure, having a data interface and a processor, wherein the data processing system is configured to carry out a method according to one or more example embodiments of the present invention.

One or more example embodiments of the present invention further relate to a medical imaging system, having the data processing system according to one or more example embodiments of the present invention and a computed tomography device for recording the first spectral computed tomography data. It can also be provided that the computed tomography device is configured for recording the second spectral computed tomography data and/or the third spectral computed tomography data.

The computed tomography device can be configured for example for recording spectral computed tomography data, in particular the first, second and/or third spectral computed tomography data, on the basis of photon-counting computed tomography and/or dual-energy computed tomography, in particular dual-source computed tomography.

One or more example embodiments of the present invention further relate to a medical cryoablation system, having the medical imaging system and a cryoablation probe.

The provision of thermal conductivity data can thus enable in particular a functional therapy planning. Here, in particular in comparison with image fusion in magnetic resonance tomography, the outlay for the imaging to be carried out before the start of the ablation is reduced. During the ablation, too, use can be made of the advantages of computed tomography in relation to 3D imaging and speed as well as the use of metal parts in the examination region.

In addition, therapy monitoring of the cryoablation zone being frozen is possible. A cryoablation can thus be assessed and documented, in particular quantitatively assessed and documented, in relation to a precise and full coverage of the region to be treated as well as the degree of freezing.

The method for providing thermal conductivity data can be in particular a computer-implemented method.

One or more example embodiments of the present invention further relate to a computer program product, comprising instructions which, when the instructions are executed by a computer, cause the computer to carry out the method according to one or more example embodiments of the present invention.

The computer program product can for example be a computer program or comprise at least one additional component in addition to the computer program. The at least one additional component of the computer program product can be embodied as hardware and/or as software.

The computer program product can have for example a storage medium, on which at least one part of the computer program product is stored, and/or a key for authenticating a user of the computer program product, in particular in the form of a dongle. The computer program product and/or the computer program can have for example a cloud application program, which is embodied to distribute the instructions to different processing units, in particular different computers, of a cloud computing system, wherein each of the processing units is embodied to execute one or several of the instructions.

One or more example embodiments of the present invention further relate to a computer-readable storage medium, comprising instructions which, when the instructions are executed by a computer, cause the computer to carry out the method according to one or more example embodiments of the present invention.

For example, the computer program product according to one of the embodiments disclosed in this application and/or the computer program according to one of the embodiments disclosed in this application can be stored on the computer-readable storage medium. The computer-readable storage medium can be for example a memory stick, a hard disk or another data carrier, which can be in particular detachably connected to a computer or permanently integrated into a computer. The computer-readable storage medium can for example form a region of a storage system, wherein the data processing system is connected to the storage system via the data interface.

The data processing system can have for example one or several components in the form of hardware and/or one or several components in the form of software. The data processing system can be formed for example at least partially by a cloud computing system. The data processing system can be and/or have for example a cloud computing system, a computer network, a computer, a tablet computer, a smartphone or the like or a combination thereof.

The hardware can for example interact with software and/or be configurable via software. The software can be executed for example via the hardware. The hardware can be for example a storage system, an FPGA system (field-programmable gate array) an ASIC system (application-specific integrated circuit), a microcontroller system, a processor system and combinations thereof. The processor system can comprise for example a microprocessor and/or several interacting microprocessors.

The steps of the method can be carried out for example in the processor of the data processing system, in particular in the form of calculations. A calculation, for example the calculation of the thermal conductivity data and/or the calculation of the representation of the freezing zone, can take place in particular by an algorithm, for example a trained machine learning algorithm, being applied to the data on which the calculation is based.

A data transfer between components of the medical imaging system and/or the medical cryoablation system can take place for example in each case via a suitable data transfer interface. The data transfer interface for data transfer to and/or from a component of the medical imaging system and/or of the medical cryoablation system can be realized at least partially in the form of software and/or at least partially in the form of hardware. The data transfer interface can be configured for example for storing data in and/or for reading data in from a region of the storage system, wherein one or several components of the medical imaging system and/or of the medical cryoablation system can access this region of the storage system.

Data, in particular the first, second and/or third spectral computed tomography data, can for example be received by a signal which carries the data being received and/or by the data being read in, in particular from a computer-readable storage medium. Data, in particular the thermal conductivity data, the representation of the freezing zone, the fat map, the water map, the density change map, the freezing map and the operating parameter of the cryoablation probe, can be provided for example by a signal which carries the data being transmitted and/or by the data being written into a computer-readable storage medium and/or by the data being displayed on a screen.

The thermal conductivity data, the representation of the freezing zone, the fat map, the water map, the density change map and the freezing map can in each case be structured in particular in the form of two-dimensional image data or three-dimensional image data.

In the context of one or more example embodiments of the present invention, features which are described in relation to different embodiments and/or different claim categories (method, use, apparatus, system, arrangement, etc.) can be combined to form further embodiments of the present invention. For example, a claim relating to an apparatus can also be developed with features which are described or claimed in connection with a method, and vice versa. In this context, functional features of a method can be implemented by correspondingly embodied object components. The use of the indefinite article "a" or "an" does not preclude the relevant feature also being present plurally. In the context of the present application, the expressions "on the basis of" and "based on" can be understood, in particular, in the sense of the expression "using". In particular, any wording according to which a first feature is calculated (or ascertained, generated etc.) on the basis of a second feature does not exclude the possibility that the first feature is further calculated (or ascertained, generated etc.) on the basis of a third feature.

BRIEF DESCRIPTION OF THE DRAWINGS

The present invention will be explained below on the basis of exemplary embodiments with reference to the accompanying figures. The representation in the figures is schematic, greatly simplified and not necessarily to scale.

DETAILED DESCRIPTION

Figure 1:
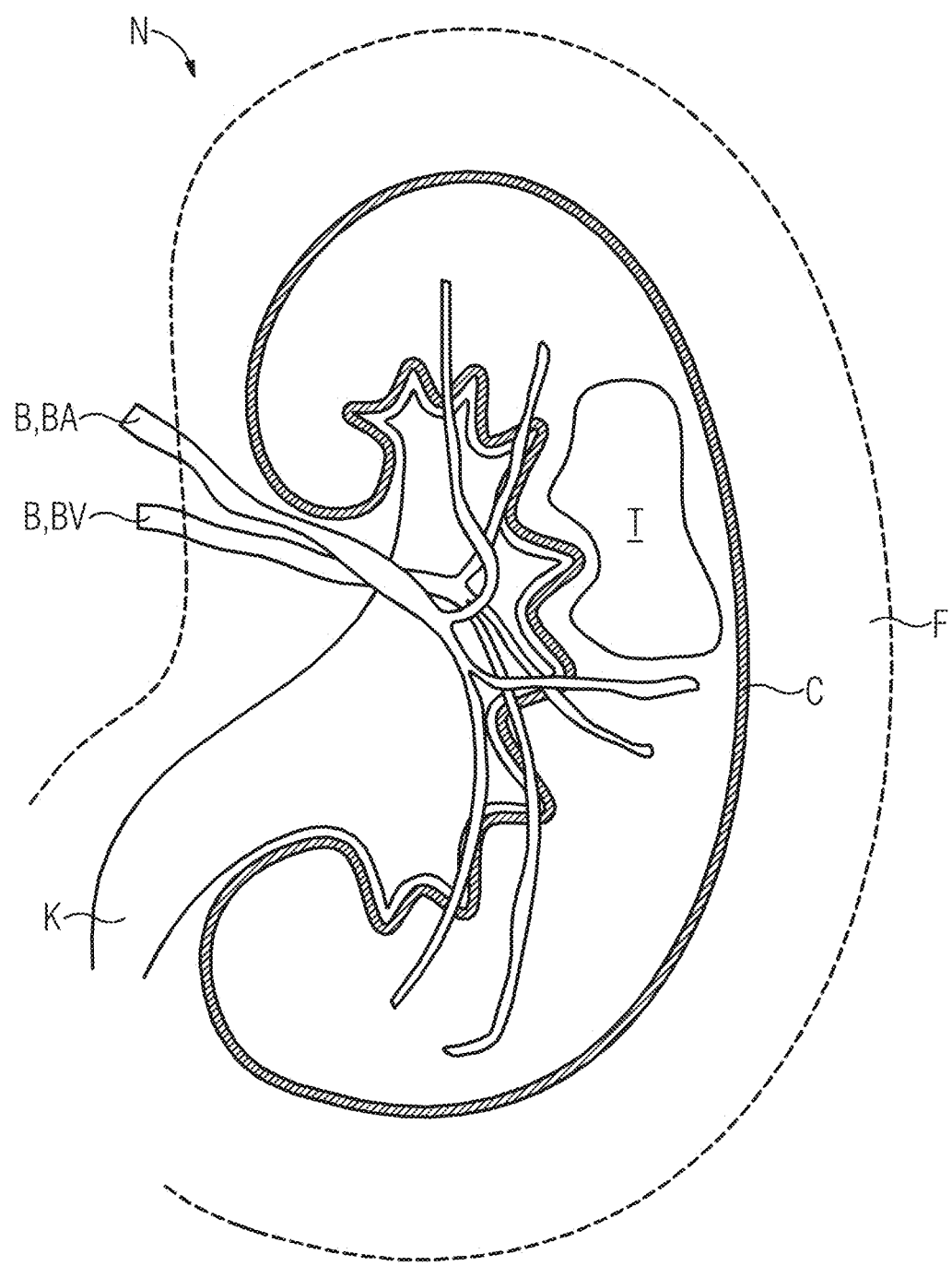
FIG. 1 shows an anatomical structure in a first state of the anatomical structure.

One or more example embodiments of the present invention relate to a method for providing thermal conductivity data relating to an anatomical structure, the method comprising:
  receiving first spectral computed tomography data relating to the anatomical structure,
  calculating a fat map of the anatomical structure and a water map of the anatomical structure on the basis of the first spectral computed tomography data,
  calculating the thermal conductivity data relating to the anatomical structure on the basis of the fat map and the water map,
  providing the thermal conductivity data.

A method for providing thermal conductivity data relating to an anatomical structure is further disclosed herewith, the method comprising:

receiving first spectral computed tomography data relating to the anatomical structure, calculating the thermal conductivity data relating to the anatomical structure on the basis of the first spectral computed tomography data, providing the thermal conductivity data.

Spectral computed tomography data, in particular the first spectral computed tomography data, can be recorded for example on the basis of photon-counting computed tomography and/or dual-energy computed tomography, in particular dual-source computed tomography.

The anatomical structure can be for example an organ, in particular a kidney, a pancreas or a bone. The anatomical structure can have for example the organ and a tissue adjacent to the organ. The fat map of the anatomical structure and the water map of the anatomical structure can be calculated for example on the basis of a material decomposition and/or a multicompartment segmentation. For example, the fat map of the anatomical structure and the water map of the anatomical structure can be calculated by a fat compartment and a water compartment being segmented, in particular simultaneously segmented, on the basis of the first spectral computed tomography data.

The thermal conductivity data can comprise for example a thermal conductivity map of the anatomical structure. The thermal conductivity data can for example relate to a thermal tissue conductivity and/or be used for planning and/or monitoring a cryoablation. The thermal tissue conductivity is determined essentially by the ratio of fat to water. An image point with a relatively high water content can for example be associated with a higher thermal conductivity than an image point with a relatively high fat content. The fat map and the water map can be used for example for planning a cryotherapy of a region of the anatomical structure to be treated, for example for calculating an extent of a cryoablation and/or for positioning a cryoablation probe.

In particular, it can be provided that a representation of a fluid-guiding substructure of the anatomical structure is generated on the basis of the first spectral computed tomography data and/or on the basis of the fat map of the anatomical structure and/or the water map of the anatomical structure, wherein the thermal conductivity data is calculated on the basis of the representation of the fluid-guiding substructure of the anatomical structure.

The fluid-guiding substructure of the anatomical structure can form a thermal bridge, for example. It is possible, for example, to introduce heat via the thermal bridge into the cryoablation zone in order to counteract the removal of heat which takes place via the cryoablation probe. The fluid-guiding substructure of the anatomical structure can be for example a vessel, in particular a blood vessel. The kidney, as an example of an anatomical structure, can have in particular a fluid-guiding substructure in the form of a renal calyx system. The representation of the fluid-guiding substructure can be generated for example in that it is calculated on the basis of an increased water content of the fluid-guiding substructure.

One embodiment provides that the anatomical structure has a region to be treated, wherein a representation of a freezing zone for a cryoablation of the region to be treated is calculated on the basis of the thermal conductivity data.

The region to be treated can be a tumor, for example. The freezing zone can be understood in particular to be a target ablation zone, the freezing of which effects a successful treatment of the region to be treated without destroying relevant adjacent structures in the process. The representation of the freezing zone can further be calculated on the basis of a representation of the region to be treated and/or a region to be left undamaged. In particular, a boundary zone of interest, for example in the form of a transition between the cortex and the perirenal tissue, can be taken into consideration in the calculation of the freezing zone.

One embodiment provides that, for each time point of a plurality of consecutive time points, a representation of the freezing zone relating to this time point is calculated in each case on the basis of the thermal conductivity data. Information about a freezing speed, for example, can be generated therefrom.

One embodiment provides that a position for a cryoablation probe is calculated on the basis of the thermal conductivity data, in particular calculated for the cryoablation of the region to be treated. The position of the cryoablation probe can be related for example to the anatomical structure and/or to a coordinate system of a cryoablation system. It can also be provided that, for each cryoablation probe of a plurality of cryoablation probes, a position for this cryoablation probe is calculated on the basis of the thermal conductivity data, in particular calculated for the cryoablation of the region to be treated.

One embodiment provides that the first spectral computed tomography data relates to the anatomical structure in a first state of the anatomical structure in which no cryoablation probe is introduced into the anatomical structure, wherein second spectral computed tomography data is received which relates to the anatomical structure in a second state of the anatomical structure in which a cryoablation probe is introduced into the anatomical structure, wherein on the basis of the first spectral computed tomography data and the second spectral computed tomography data, an image showing the anatomical structure in the second state of the anatomical structure is calculated, wherein hardening artifacts caused by the cryoablation probe in the second spectral computed tomography data are corrected on the basis of the first spectral computed tomography data in order to calculate the image showing the anatomical structure in the second state of the anatomical structure.

The second spectral computed tomography data can be recorded in particular while the cryoablation probe is introduced into the anatomical structure. In particular, the first spectral computed tomography data and the second spectral computed tomography data can be registered relative to one another, for example on the basis of a nonrigid deformation correction.

On the basis of the image showing the anatomical structure in the second state of the anatomical structure, the cryoablation probe and/or a position of the cryoablation probe relative to the anatomical structure can be visualized, in particular free from hardening artifacts and/or indirectly in the form of a deformation of the anatomical structure.

It can also be provided that the thermal conductivity data is further calculated on the basis of the second spectral computed tomography data.

One embodiment provides that the second spectral computed tomography data was recorded with a higher X-ray tube voltage than the first spectral computed tomography data.

The use of as high as possible an X-ray tube voltage for recording the second spectral computed tomography data makes it possible to reduce the hardening artifacts which are caused by the cryoablation probe in the second spectral computed tomography data.

One embodiment provides that third spectral computed tomography data is received which relates to the anatomical structure in a third state of the anatomical structure in which the cryoablation probe is introduced into the anatomical structure, wherein the third state of the anatomical structure results from the second state of the anatomical structure on account of a removal of heat via the cryoablation probe, wherein a density change map of the anatomical structure is calculated on the basis of the second spectral computed tomography data and the third spectral computed tomography data.

On account of the removal of heat via the cryoablation probe, in particular a freezing and thus a change in density can be effected. Here, an amount of the change in density corresponds to a degree of freezing. The density change card can relate in particular to an X-ray density and/or assign a CT value to each image point of a plurality of image points, for example on a Hounsfield scale.

The third spectral computed tomography data can be recorded in particular while the cryoablation probe is introduced into the anatomical structure. In particular, it can be provided that the second spectral computed tomography data and the third spectral computed tomography data are registered relative to one another, for example on the basis of a nonrigid deformation correction, and/or that the first spectral computed tomography data and the third spectral computed tomography data are registered relative to one another, for example on the basis of a nonrigid deformation correction.

It can also be provided that an image showing the anatomical structure in the third state of the anatomical structure is calculated on the basis of the first spectral computed tomography data and the third spectral computed tomography data, wherein hardening artifacts caused by the cryoablation probe and/or by a freezing in the third spectral computed tomography data are corrected on the basis of the first spectral computed tomography data in order to calculate the image showing the anatomical structure in the third state of the anatomical structure.

On the basis of the image showing the anatomical structure in the third state of the anatomical structure, the cryoablation probe and/or a position of the cryoablation probe relative to the anatomical structure can be visualized, in particular free from hardening artifacts and/or indirectly in the form of a deformation of the anatomical structure.

The second spectral computed tomography data and/or the third spectral computed tomography data can be recorded for example on the basis of photon-counting computed tomography and/or dual-energy computed tomography, in particular dual-source computed tomography.

In particular, it can be provided that the third spectral computed tomography data was recorded with a higher X-ray tube voltage than the first spectral computed tomography data. The use of as high as possible an X-ray tube voltage for recording the third spectral computed tomography data makes it possible to reduce the hardening artifacts which are caused by the cryoablation probe in the third spectral computed tomography data.

With the aid of spectral computed tomography, the change in density can be determined in particular independently of an assessment of the water content and the fat content, as the X-ray radiation in the region of the freezing is not fully extinguished. Spectral computed tomography, in particular in the form of monoenergetic imaging, can in particular help to reduce the hardening artifacts which are caused by the cryoablation probe and/or the freezing in the second spectral computed tomography data and/or in the third spectral computed tomography data.

One embodiment provides that a freezing map of the region to be treated is calculated on the basis of the density change map.

It can also be provided that the freezing map is further calculated on the basis of the thermal conductivity data and/or that the freezing map is further calculated on the basis of the fat map of the anatomical structure and/or the water map of the anatomical structure. The freezing map can in particular assign a degree of freezing to each image point of a plurality of image points. Image points can be for example 2D image points (pixels) or 3D image points (voxels, volume elements).

It can also be provided that the representation of the freezing zone calculated on the basis of the thermal conductivity data is shown overlaid onto the density change map and/or the freezing map.

One embodiment provides that an operating parameter of the cryoablation probe is calculated by a control algorithm being applied to the representation of the freezing zone as a reference variable and to the freezing map as a control variable. In this way, for example, the achievement of an optimum freezing can be monitored and/or an improved adaptation to a region to be left undamaged can take place in order to achieve as complete an ablation as possible. The operating parameter of the cryoablation probe can relate for example to a temperature of the cryoablation probe and/or a heat removal capacity of the cryoablation probe. In particular, the cryoablation probe can be controlled on the basis of the operating parameter of the cryoablation probe.

In particular, it can be provided that, for each ablation time point of a plurality of consecutive ablation time points during the cryoablation, in each case spectral computed tomography data is provided for this ablation time point and in each case a freezing map of the region to be treated is calculated as is described in the case of the third spectral computed tomography data.

A temporal course of the freezing can be analyzed for example on the basis of a vector analysis over the plurality of freezing maps and/or correlated with the thermal conductivity data and/or the representation of the freezing zone, in particular for each time point of the plurality of consecutive time points for which in each case a representation of the freezing zone was calculated, in particular in order to be able to assess an extent of the freezing, for example with regard to a correlation with a planned course of the cryoablation.

The first spectral computed tomography data can be recorded in particular without providing the anatomical structure with a contrast medium for this purpose. The second spectral computed tomography data can be recorded in particular without providing the anatomical structure with a contrast medium for this purpose. The third spectral computed tomography data can be recorded in particular without providing the anatomical structure with a contrast medium for this purpose.

Should contrast-medium-supported computed tomography become necessary during the cryoablation, for example if acute bleeding is suspected, a spectral segmentation of iodine is also possible within the ablation zone with reference to the existing density maps, for example in order to generate an iodine map of the anatomical structure.

Residual hemorrhages and larger areas of necrosis can also be visualized as described above and/or monitored during the cryoablation. The freezing can likewise be monitored by way of a change in the water content and/or the density.

One or more example embodiments of the present invention further relate to a data processing system for providing thermal conductivity data relating to an anatomical structure, having a data interface and a processor, wherein the data processing system is configured to carry out a method according to one or more example embodiments of the present invention.

One or more example embodiments of the present invention further relate to a medical imaging system, having the data processing system according to one or more example embodiments of the present invention and a computed tomography device for recording the first spectral computed tomography data. It can also be provided that the computed tomography device is configured for recording the second spectral computed tomography data and/or the third spectral computed tomography data.

The computed tomography device can be configured for example for recording spectral computed tomography data, in particular the first, second and/or third spectral computed tomography data, on the basis of photon-counting computed tomography and/or dual-energy computed tomography, in particular dual-source computed tomography.

One or more example embodiments of the present invention further relate to a medical cryoablation system, having the medical imaging system and a cryoablation probe.

The provision of thermal conductivity data can thus enable in particular a functional therapy planning. Here, in particular in comparison with image fusion in magnetic resonance tomography, the outlay for the imaging to be carried out before the start of the ablation is reduced. During the ablation, too, use can be made of the advantages of computed tomography in relation to 3D imaging and speed as well as the use of metal parts in the examination region.

In addition, therapy monitoring of the cryoablation zone being frozen is possible. A cryoablation can thus be assessed and documented, in particular quantitatively assessed and documented, in relation to a precise and full coverage of the region to be treated as well as the degree of freezing.

The method for providing thermal conductivity data can be in particular a computer-implemented method.

One or more example embodiments of the present invention further relate to a computer program product, comprising instructions which, when the instructions are executed by a computer, cause the computer to carry out the method according to one or more example embodiments of the present invention.

The computer program product can for example be a computer program or comprise at least one additional component in addition to the computer program. The at least one additional component of the computer program product can be embodied as hardware and/or as software.

The computer program product can have for example a storage medium, on which at least one part of the computer program product is stored, and/or a key for authenticating a user of the computer program product, in particular in the form of a dongle. The computer program product and/or the computer program can have for example a cloud application program, which is embodied to distribute the instructions to different processing units, in particular different computers, of a cloud computing system, wherein each of the processing units is embodied to execute one or several of the instructions.

One or more example embodiments of the present invention further relate to a computer-readable storage medium, comprising instructions which, when the instructions are executed by a computer, cause the computer to carry out the method according to one or more example embodiments of the present invention.

For example, the computer program product according to one of the embodiments disclosed in this application and/or the computer program according to one of the embodiments disclosed in this application can be stored on the computer-readable storage medium. The computer-readable storage medium can be for example a memory stick, a hard disk or another data carrier, which can be in particular detachably connected to a computer or permanently integrated into a computer. The computer-readable storage medium can for example form a region of a storage system, wherein the data processing system is connected to the storage system via the data interface.

The data processing system can have for example one or several components in the form of hardware and/or one or several components in the form of software. The data processing system can be formed for example at least partially by a cloud computing system. The data processing system can be and/or have for example a cloud computing system, a computer network, a computer, a tablet computer, a smartphone or the like or a combination thereof.

The hardware can for example interact with software and/or be configurable via software. The software can be executed for example via the hardware. The hardware can be for example a storage system, an FPGA system (field-programmable gate array) an ASIC system (application-specific integrated circuit), a microcontroller system, a processor system and combinations thereof. The processor system can comprise for example a microprocessor and/or several interacting microprocessors.

The steps of the method can be carried out for example in the processor of the data processing system, in particular in the form of calculations. A calculation, for example the calculation of the thermal conductivity data and/or the calculation of the representation of the freezing zone, can take place in particular by an algorithm, for example a trained machine learning algorithm, being applied to the data on which the calculation is based.

A data transfer between components of the medical imaging system and/or the medical cryoablation system can take place for example in each case via a suitable data transfer interface. The data transfer interface for data transfer to and/or from a component of the medical imaging system and/or of the medical cryoablation system can be realized at least partially in the form of software and/or at least partially in the form of hardware. The data transfer interface can be configured for example for storing data in and/or for reading data in from a region of the storage system, wherein one or several components of the medical imaging system and/or of the medical cryoablation system can access this region of the storage system.

Data, in particular the first, second and/or third spectral computed tomography data, can for example be received by a signal which carries the data being received and/or by the data being read in, in particular from a computer-readable storage medium. Data, in particular the thermal conductivity data, the representation of the freezing zone, the fat map, the water map, the density change map, the freezing map and the operating parameter of the cryoablation probe, can be provided for example by a signal which carries the data being transmitted and/or by the data being written into a computer-readable storage medium and/or by the data being displayed on a screen.

The thermal conductivity data, the representation of the freezing zone, the fat map, the water map, the density change map and the freezing map can in each case be structured in particular in the form of two-dimensional image data or three-dimensional image data.

FIG. 1 shows the anatomical structure N in a first state of the anatomical structure N, in which no cryoablation probe is introduced into the anatomical structure N. The anatomical structure N is shown by way of example as a kidney with the renal capsule C and the perirenal tissue F. The anatomical structure N has a fluid-guiding substructure in the form of the blood vessels B, in particular in the form of the renal artery BA and the renal vein BV, and a fluid-guiding substructure in the form of the renal calyx system K. The anatomical structure N further has the region to be treated T in the form of a tumor.

Figure 2:
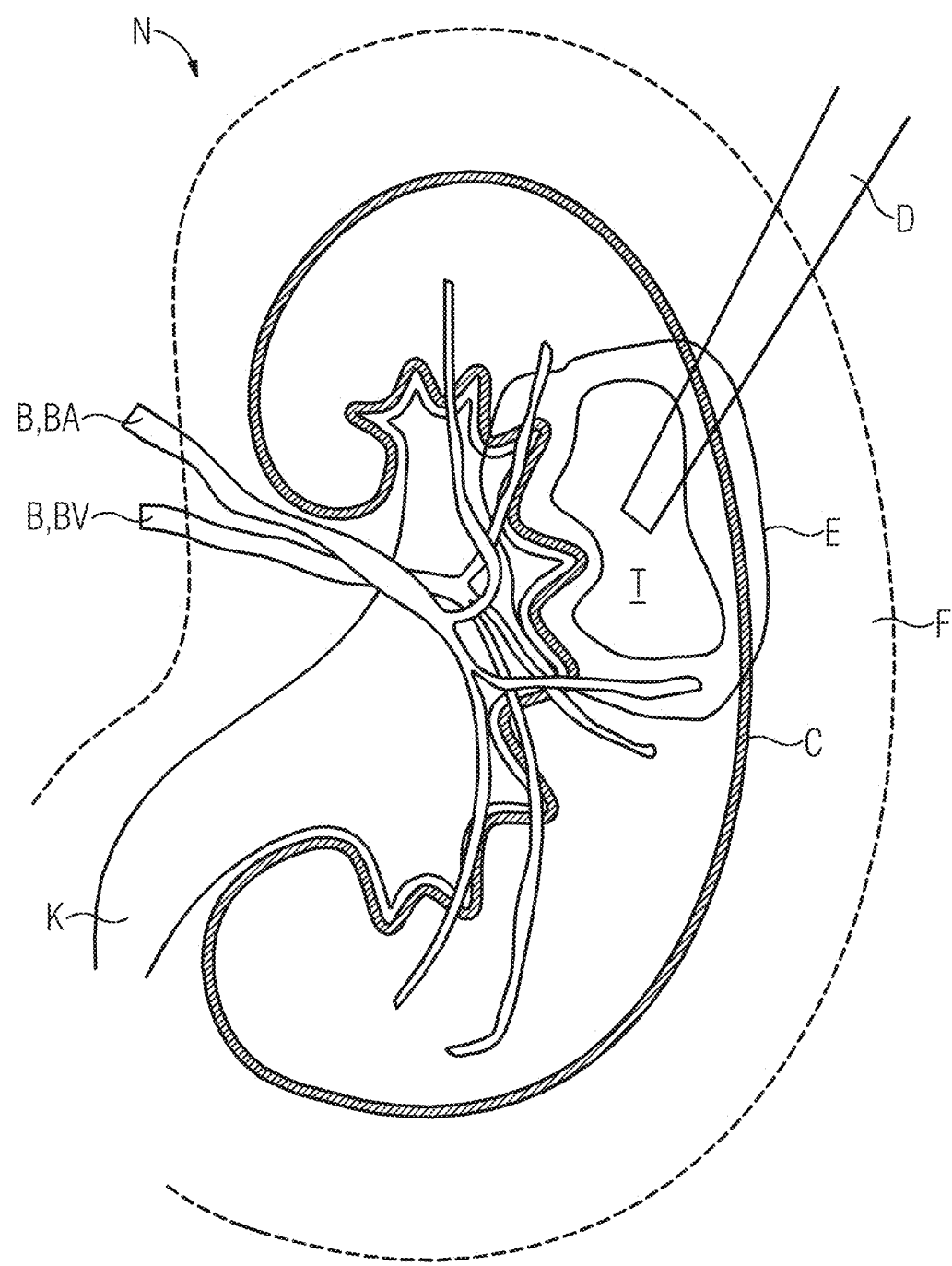
FIG. 2 shows the anatomical structure in a second state of the anatomical structure.

FIG. 2 shows the anatomical structure N in a second state of the anatomical structure N, in which the cryoablation probe D is introduced into the anatomical structure N. The freezing zone E for the cryoablation of the region to be treated T is also shown.

Figure 3:
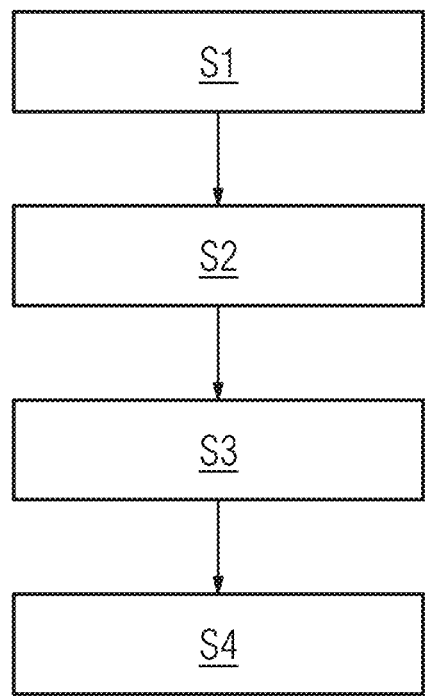
FIG. 3 shows a flowchart of a method for providing thermal conductivity data relating to an anatomical structure N.

FIG. 3 shows a flowchart of a method for providing thermal conductivity data relating to an anatomical structure N, the method comprising:
- receiving S1 first spectral computed tomography data relating to the anatomical structure N,
- calculating S2 a fat map of the anatomical structure N and a water map of the anatomical structure N on the basis of the first spectral computed tomography data,
- calculating S3 the thermal conductivity data relating to the anatomical structure N on the basis of the fat map and the water map,
- providing S4 the thermal conductivity data.

Figure 4:
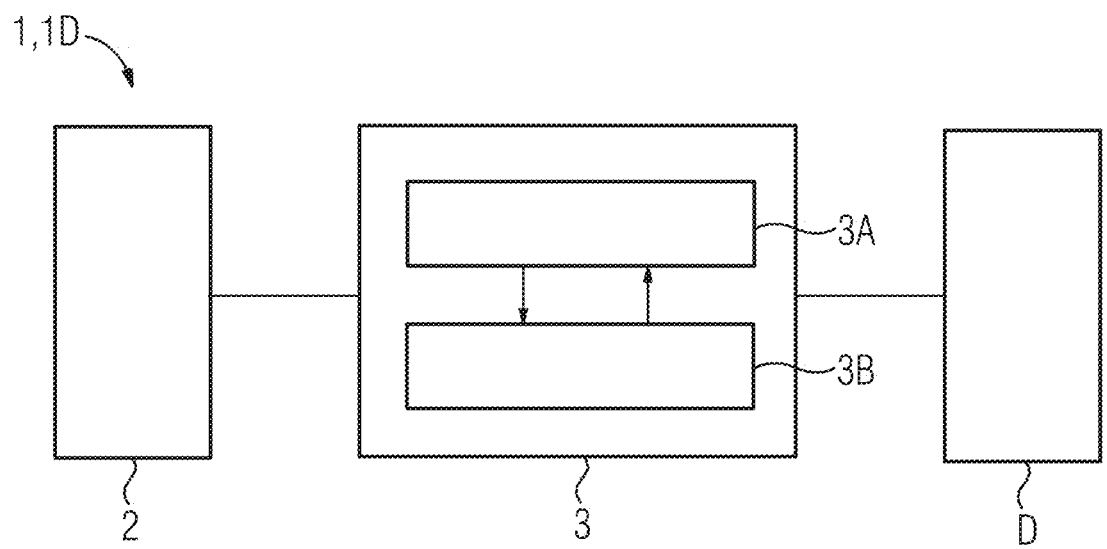
FIG. 4 shows a medical cryoablation system.

FIG. 4 shows the medical cryoablation system 1D, having the medical imaging system 1 and the cryoablation probe D. The medical imaging system 1 has the data processing system 3 and the computed tomography device 2 for recording the first spectral computed tomography data, the second spectral computed tomography data and the third spectral computed tomography data. The data processing system 3 for providing thermal conductivity data has the data interface 3A and the processor 3B, wherein the data processing system 3 is configured to carry out the method shown in FIG. 3. The data processing system 3 is connected to the computed tomography device 2, in particular connected in a cable-based or cable-free manner, in order to receive the spectral computed tomography data from the computed tomography device. The data processing system 3 is connected to the cryoablation probe D, in particular connected in a cable-based or cable-free manner, in order to provide the operating parameter of the cryoablation probe D to the cryoablation probe D.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A method for providing thermal conductivity data relating to an anatomical structure, the method comprising:
   receiving first spectral computed tomography data relating to the anatomical structure in a first state of the anatomical structure in which no cryoablation probe is introduced into the anatomical structure;
   receiving second spectral computed tomography data relating to the anatomical structure in a second state of the anatomical structure, in which a cryoablation probe is introduced into the anatomical structure;
   calculating a fat map of the anatomical structure and a water map of the anatomical structure based on the first spectral computed tomography data;
   calculating the thermal conductivity data relating to the anatomical structure based on the fat map and the water map;
   providing the thermal conductivity data; and
   calculating an image based on the first spectral computed tomography data and the second spectral computed tomography data, the image showing the anatomical structure in the second state of the anatomical structure,
   wherein hardening artifacts caused by the cryoablation probe in the second spectral computed tomography data are corrected based on the first spectral computed tomography data in order to calculate the image showing the anatomical structure in the second state of the anatomical structure.

2. The method as claimed in claim 1, further comprising:
   generating a representation of a fluid-guiding substructure of the anatomical structure based on at least one of the fat map of the anatomical structure or the water map of the anatomical structure, and wherein
   the thermal conductivity data is calculated based on the representation of the fluid-guiding substructure of the anatomical structure.

3. The method as claimed in claim 1,
   wherein the anatomical structure has a region to be treated, and
   wherein the method includes calculating, based on the thermal conductivity data, a representation of a freezing zone for a cryoablation of the region to be treated.

4. The method as claimed in claim 3, further comprising:
   wherein, for each time point of a plurality of consecutive time points, the representation of the freezing zone relating to the time point is calculated based on the thermal conductivity data.

5. The method as claimed in claim 1,
   wherein a position for the cryoablation probe is calculated based on the thermal conductivity data.

6. The method as claimed in claim 1,
   wherein the second spectral computed tomography data is recorded with a higher X-ray tube voltage than the first spectral computed tomography data.

7. The method as claimed in claim 1, further comprising:
   receiving third spectral computed tomography data relating to the anatomical structure in a third state of the anatomical structure, in which the cryoablation probe is introduced into the anatomical structure, wherein the third state of the anatomical structure results from the second state of the anatomical structure on account of a removal of heat via the cryoablation probe; and calculating a density change map of the anatomical structure based on the second spectral computed tomography data and the third spectral computed tomography data.

8. The method as claimed in claim 7, further comprising:
calculating a freezing map of a region to be treated based on the density change map.

9. The method as claimed in claim 8, further comprising:
calculating an operating parameter of the cryoablation probe by applying a control algorithm to a representation of a freezing zone as a reference variable and to the freezing map as a control variable.

10. A data processing system for providing the thermal conductivity data, the data processing system having a data interface and a processor, wherein the data processing system is configured to carry out the method as claimed in claim 1.

11. A medical imaging system, having the data processing system as claimed in claim 10 and a computed tomography device configured to record the first spectral computed tomography data.

12. A medical cryoablation system, having the medical imaging system as claimed in claim 11 and the cryoablation probe.

13. A non-transitory computer program product, comprising instructions which, when executed by a computer, cause the computer to carry out the method as claimed in claim 1.

14. A non-transitory computer-readable storage medium, comprising instructions which, when executed by a computer, cause the computer to carry out the method as claimed in claim 1.

15. The method as claimed in claim 2,
wherein the anatomical structure has a region to be treated, and
wherein the method includes calculating, based on the thermal conductivity data, a representation of a freezing zone for a cryoablation of the region to be treated.

16. The method as claimed in claim 2,
wherein a position for the cryoablation probe is calculated based on the thermal conductivity data.

17. The method as claimed in claim 6, further comprising:
receiving third spectral computed tomography data relating to the anatomical structure in a third state of the anatomical structure, in which the cryoablation probe is introduced into the anatomical structure, wherein
the third state of the anatomical structure results from the second state of the anatomical structure on account of a removal of heat via the cryoablation probe; and calculating a density change map of the anatomical structure based on the second spectral computed tomography data and the third spectral computed tomography data.

\* \* \* \* \*